United States Patent [19]
Drew et al.

[11] Patent Number: 4,491,685
[45] Date of Patent: Jan. 1, 1985

[54] CABLE CONNECTOR

[75] Inventors: Thomas J. Drew, New Baltimore; Frank S. Day, Detroit, both of Mich.

[73] Assignee: Armex Cable Corporation, Warren, Mich.

[21] Appl. No.: 498,401

[22] Filed: May 26, 1983

[51] Int. Cl.³ .......................... H02G 15/02; H01R 4/26

[52] U.S. Cl. .................................. 174/75 C; 174/88 C; 339/177 E

[58] Field of Search ............................ 174/75 C, 88 C; 339/177 R, 177 E

[56] References Cited

U.S. PATENT DOCUMENTS

| | | | |
|---|---|---|---|
| 3,107,135 | 10/1963 | Keil | 174/75 C |
| 3,368,025 | 2/1968 | Burdett et al. | 174/75 C |
| 3,778,535 | 12/1973 | Forney, Jr. | 174/88 C |
| 3,784,730 | 1/1974 | Bannies | 174/75 C |
| 3,830,957 | 8/1974 | Oberdiear | 174/75 C X |
| 4,331,374 | 5/1982 | Phillips | 174/75 C X |
| 4,373,767 | 2/1983 | Cairns | 339/177 R X |

FOREIGN PATENT DOCUMENTS

| | | | |
|---|---|---|---|
| 2357922 | 5/1975 | Fed. Rep. of Germany | 339/177 R |

*Primary Examiner*—A. C. Prescott
*Assistant Examiner*—Morris H. Nimmo
*Attorney, Agent, or Firm*—Barnes, Kisselle, Raisch, Choate, Whittemore & Hulbert

[57] ABSTRACT

A cable connector for coaxial conductors which includes an elongate composite housing with independent axially spaced gripping devices for the surface of the respective conductors. The gripping devices are rendered operative by the movement of the housing parts into assembly and sealing relationship. The outer tubular conductor is gripped on the inner and outer surfaces and the inner conductor is gripped in a collapsing collet ring formed as a part of the insertion conductor.

5 Claims, 14 Drawing Figures

CABLE CONNECTOR

FIELD OF INVENTION

Cable connectors for cable television.

BACKGROUND OF THE INVENTION

Cable television is becoming an accepted service in more and more communities. This service involves the installation of along-the-street cables as well as house-to-street cable leads. The joining of television cables differs from the joining of single strand copper wires in that in a coaxial cable there is an outer conductive tube and a concentric inner conductive core, these being insulated from each other. The material from which the conductive members are formed is usually a soft material without a high degree of tensile strength, such as aluminum. In addition, the conductive material may have a high coefficient of expansion. In areas where temperatures range from 80° to 90° Fahrenheit in the summer to 0° or below in the winter, the lineal change in the cables can be considerable.

In addition, the cable connectors are subject to rain, snow, ice and sleet and, accordingly, must be weatherproof.

It is an object of the present invention to provide a cable connector which emphatically isolates the interior and exterior conductors of a cable electrically while mechanically engaging the conductors in a manner to prevent "pull-out".

Another object of the invention is the provision of a simple mechanical housing which is sealed against the weather and which is readily assembled in the field.

Other objects and features of the invention will be apparent in the following description and claims in which the invention is set forth together with details to enable persons skilled in the art to utilize the invention, all in connection with the best mode presently contemplated for the invention.

BRIEF DESCRIPTION OF THE DRAWINGS

Drawings accompany the disclosure and the various views thereof may be briefly described as:

FIG. 9, a sectional view of a cable connector as in FIG. 1 with the coaxial cable secured within the connector.

DETAILED DESCRIPTION OF THE INVENTION AND THE MANNER AND PROCESS OF USING IT

Figure 1:
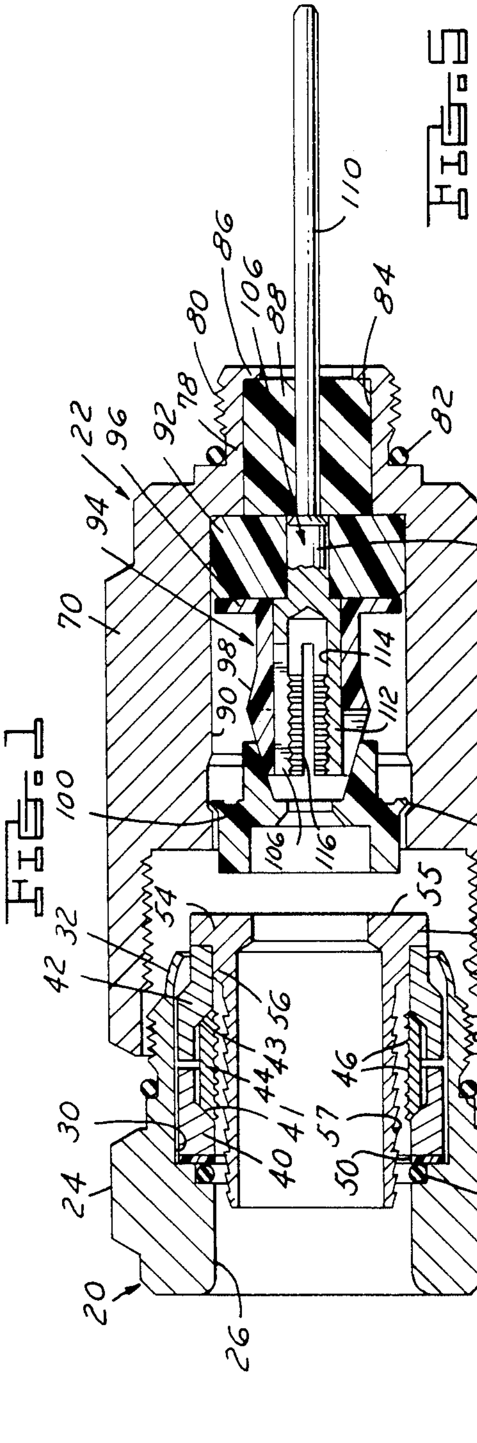
FIG. 1, a longitudinal sectional view of ah assembled connector without the cable.

With reference to the drawings, in FIG. 1, a sectional view of the elongate connector is illustrated having a base housing 20 and a screw-on forward housing 22. The base housing 20 has a thickened portion 24 which can be used as a wrench surface and a central bore 26 which is stepped to a first shoulder to receive an O-ring seal 28 and stepped to a cylindrical recess 30 which terminates in an inturned retaining flange 32. On the surface outside the bore 30 a shoulder 34 backs up an O-ring 36 and a thread 38 is formed to engage threads in the forward housing 22.

Figure 3:
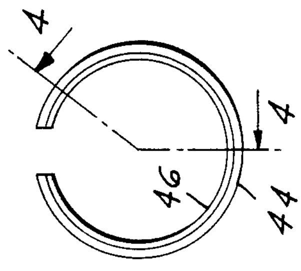
FIG. 3, an end view of an external locking sleeve.
Figure 4:
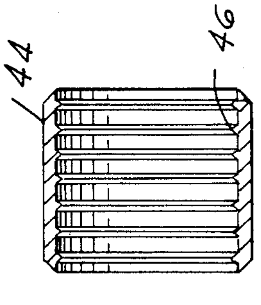
FIG. 4, a sectional view of the locking sleeve on line 4—4 of FIG. 3.
Figure 5:
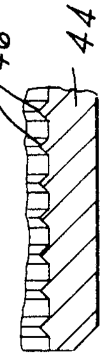
FIG. 5, an enlarged view of the teeth on a locking sleeve.
Figure 5:
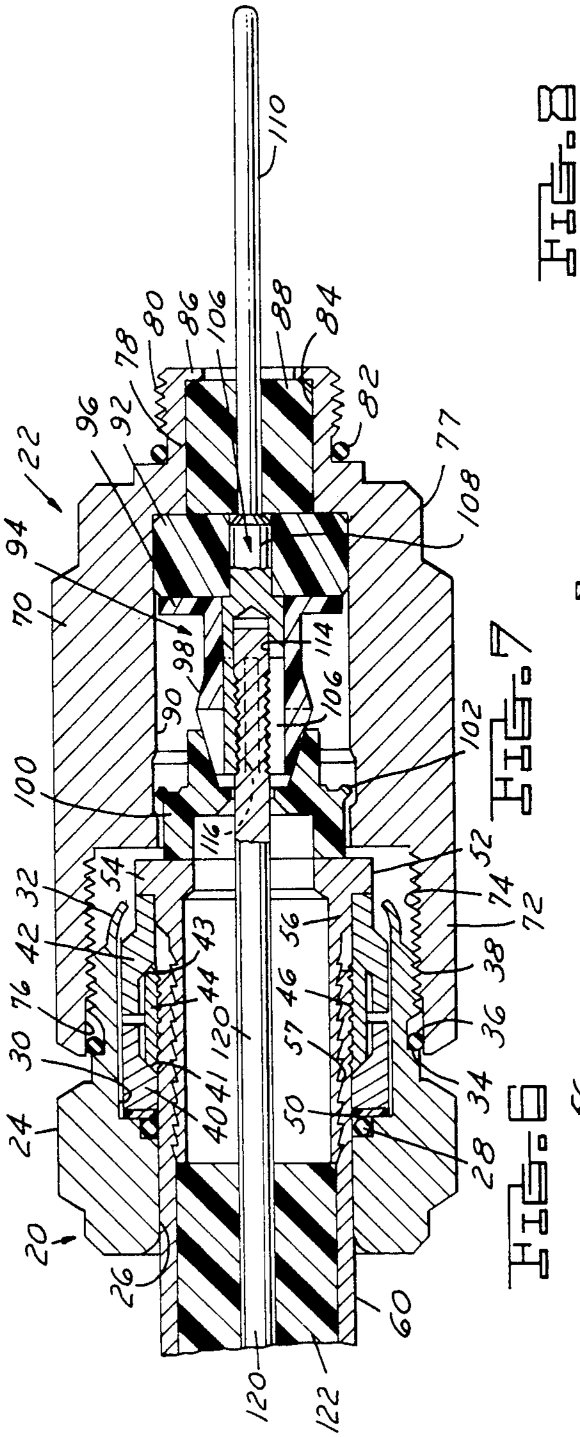

Within the bore 30 is a three-piece gripping structure consisting of opposed spaced camming rings 40 and 42. Each ring has a recess facing a similar recess in the opposed ring, these recesses having opposed chamfers 41 and 43 which contact the chamfered ends of a split compressing sleeve 44 illustrated in FIGS. 3, 4 and 5. This sleeve has annular teeth 46 formed on its inner surface with a saw tooth profile as illustrated in the enlarged view of FIG. 5.

Figure 6:
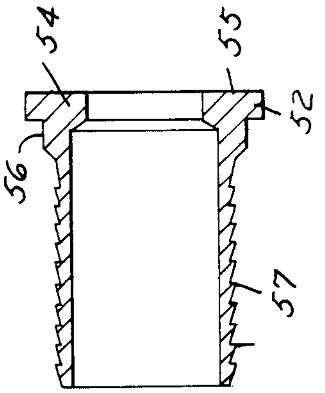
FIG. 6, a sectional view of an internal locking sleeve.

The ring 40 has an annular flat surface which faces a flat washer 50 backed against a shoulder at the end of recess 30. The outer end of ring 42 abuts a flange 52 on the end of an inner sleeve or anvil member 54. The ring 42 rides on an annular portion 56 of the sleeve 54 (FIG. 6) and the remaining cylindrical wall of sleeve 54 is provided with annular saw tooth serrations 57 angled toward the flange 52. Prior to assembly, the facing surfaces of the rings 40, 42 are spaced from each other as shown in FIG. 1. Thus, the base housing 20 is provided to enclose and grip the outer sleeve or tubular conductor 60 illustrated in FIG. 2, as will be described.

The screw-on forward housing 22 has a body portion 70 which has an internally threaded cylindrical extension 72 with threads 74 terminating at the outer end in a surface 76 which cooperates, in assembly, with O-ring 36. The other end of the body 70 has a first reduced shoulder 77 which may serve as a wrench surface and a second reduced tip 78 externally threaded at 80. An O-ring 82 is provided at the base of the threads 80.

Figure 7:
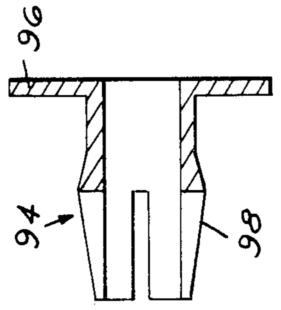
FIG. 7, a sectional view of a locking collet.

The forward housing has a stepped internal bore with a smaller portion 84 within the tip 78 terminating at a small retaining flange 86 to retain an annular insulation block 88 fomed of Teflon or a similar dense plastic. The larger portion 90 of the bore contains also an annular insulation block 92 of Teflon or a similar dense plastic. Axially adjacent the block 92 is a collet 94 (FIG. 7) having a base flange 96 backed against the block 92 and a split collet end 98 with a cylindrical bore and a tapered end to be received in a central tapered recess in the end of a collet closer element 100. Each of the elements 94 and 100 are formed from a dense non-conductive plastic such as Celgon (Trademark). The nose end of the collet closer is formed with circumferentially spaced ribs which allow expansion as the nose is forced on to the collet. A small lip 102 on the outer circumference of the collet closer is retained in a shallow annular recess in the inner surface of the bore 90. The blunt end of the collet closer 100 is facing a flat annular surface 55 of the inner sleeve 54 and the two surfaces will engage in assembly.

Figure 8:
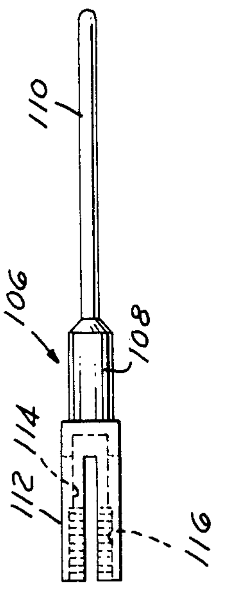
FIG. 8, an elevation of a central conductor extension.

Within a central recess of the collet 94 and extending through the insulator blocks 92 and 88 is a center metal conductor element 106, for example, hard brass (FIG. 1 and FIG. 8) which has a cylindrical mid-portion 108 received in the insulator block 92 and a conductor shaft 110 extends through the block 88 and outwardly of the body portion 70. At the other end of the center conductor is a hollow split end 112 which has a recess 114 to receive one end of the central element 120 (FIG. 2) of the coaxial conductor which is inulated from the outer conductor by a body of insulation 122. The recess 114 in the split end 112 has internal annular tooth serrations 116.

Figure 2:
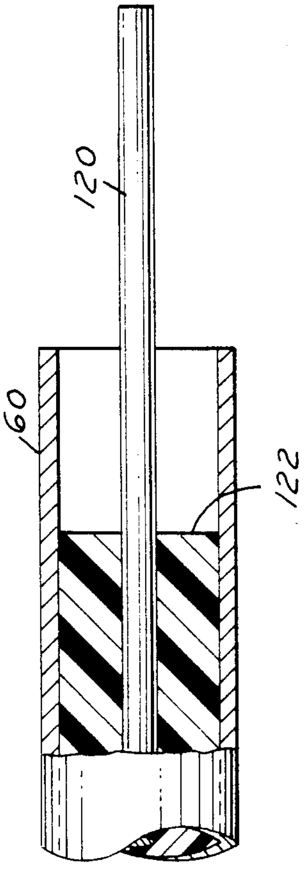
FIG. 2, a view of a cable end.

In the operation of the device, it will be noted in FIG. 2 that the coaxial cable to be captured in the connector has the outer conductive sheath 60, the inner conductor 120, and the insulation interposed between the two. In use, the insulation is removed for a specified distance into the outer conductor, as shown in FIG. 2. Then with parts as positioned in FIG. 1, the cable is inserted into the connector. The outer sheath will slide into the annular gap between the three part assembly of parts 40, 42, 44 and the outer surface of sleeve 54. At the same time the inner conductor 120 will enter the central recess of end 112 of conductor element 106. With the conductor so positioned, the forward housing 22 is moved toward and screwed on to the base housing 20. As these parts move axially toward each other, the end surface 55 on sleeve 54 will contact the end of the collet closer 100. The continued axial closer facilitated by the screw connection forces the part 42 toward the part 40 and collapses the split ring 44 inwardly by action of the chamfered parts engaging each other. The outer conductor 60 is squeezed radially between the teeth 46 of ring 44 and the teeth 57 on sleeve 54. This action is limited by the ends of rings 40 and 42 meeting in contact at the center.

The axial force on collet closer 100 forces it onto the tapered end of the collet 98 and this results in an ensmalling of the central toothed recess 114 of the central conductor 112. The teeth 116 close in on and bite into the inner conductor 120. FIG. 9 illustrates the parts in the cable gripping position, the base housing 20 being screwed tight into the forward housing 22. The combined connector housing is then ready to be secured in a suitable socket with the two elements of the coaxial cable still insulated from each other. The toothed elements bite into the metal conductors over a reasonably large area, thus distributing the tensile load due to the weight of the cables and possible contraction due to low temperatures.

Figures 10, 11, 12, 13, 14:
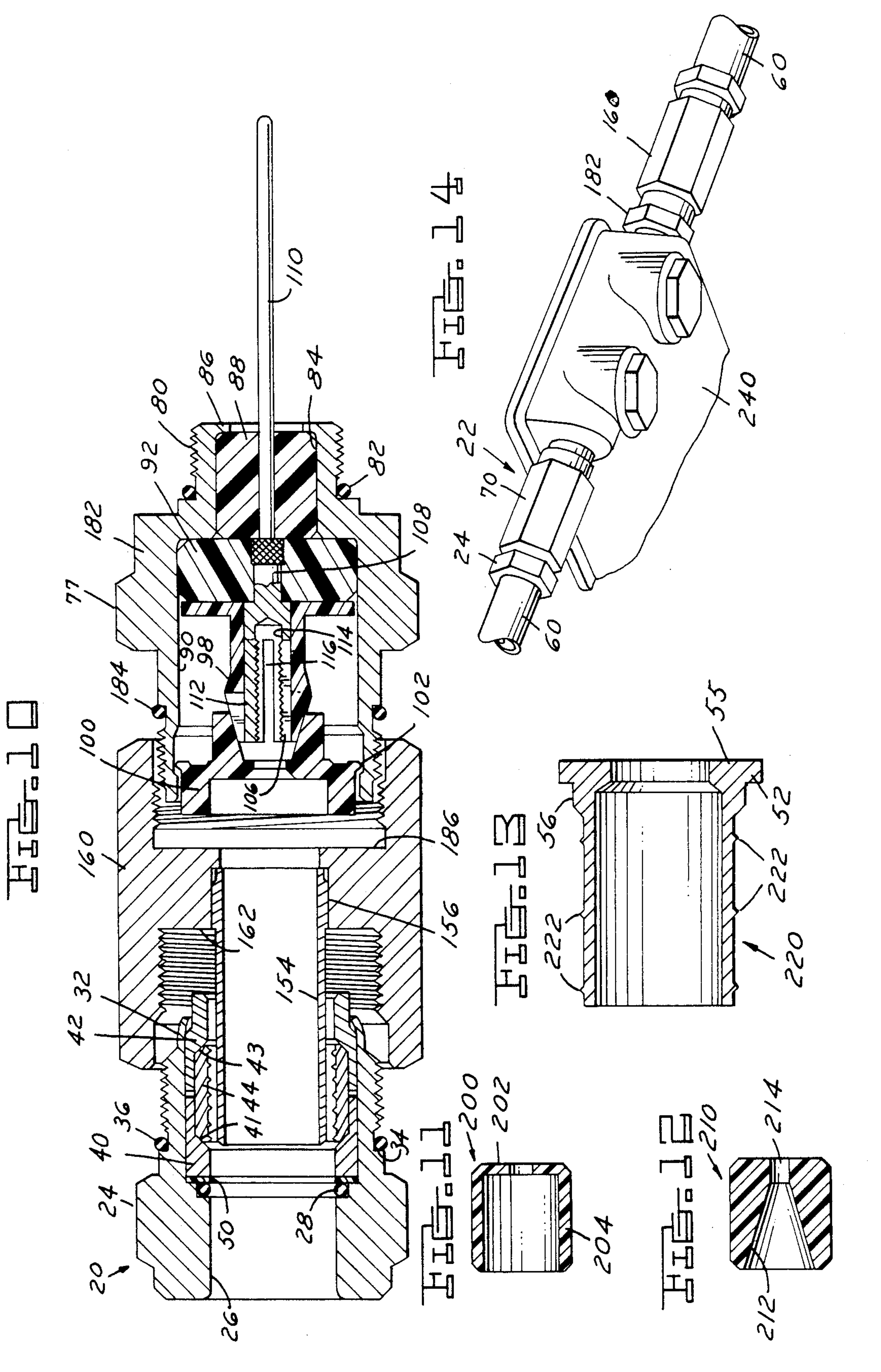
FIG. 10, a longitudinal section of a modified cable connector.
FIG. 11, a side elevation, partially in section, showing a modified insulation block.
FIG. 12, a side elevation, partially in section, showing a second modification of an insulation block.
FIG. 13, a view of a modified gripping sleeve.
FIG. 14, a perspective view of a junction box with which the connectors are used.

In FIG. 10, a three-piece housing unit is illustrated. The base element 20 is essentially the same as that shown in FIGS. 1 and 9 and like parts have like reference characters applied. An inner sleeve 154 which will telescope inside the outer tubular conductor is seated at one end 156 in a central bore of intermediate body member 160. The outer surface of this sleeve is not shown with toothed serrations but could have these if desired. The intermediate member 160 has one end which threads over the base member 20. The shoulder 162 abuts the end of the ring 42 to effect the compression force on the split ring 44. The other end of the intermediate body member 160 threads over a modified forward member 182 which houses the collet combination previously described in connection with FIG. 1. An O-ring 184 seals this thread connection.

A shoulder 186 opposed to shoulder 162 on body 160 will contact the end of collet closer 100 to provide the axial force to squeeze the inner conductor in the end 112 of the conductor 106. The operation of the unit shown in FIG. 10 is essentially the same as that described in connection with FIG. 1.

FIGS. 11 and 12 illustrate modified insulation blocks which may be substituted for the block 88 of F'G. 1. FIG. 11 illustrates a cup-shaped element 200 having a base 202 and straight cylindrical side walls 204. The base has a perforation to receive conductor 110 (FIG. 1). This insulator element 200 is captive between the retaining flange 86 and the block 92 to provide a weather seal. FIG. 12 illustrates a modified cup 210 with a tapered . internal recess 212 ensmalling to a perforation 214 which receives the conductor 110.

These modified insulator elements have been found to improve the return-loss characteristics of the connector significantly in terms of the decibel rating. The elements are made of a dielectric plastic such as a high density nylon or Teflon with good compression strength to provide a sealing contact with the adjacent components.

FIG. 13 illustrates a modified gripping sleeve 220 which in some applications can be substituted for sleeve 54 of FIG. 1. The sleeve 54 has a saw-tooth surface and the conductor sheath is clamped between this sleeve and the contracting collet 44. In some instances, when the collar 24 is tightened into the body 22, the conductor sheath will be shaped into the saw-tooth surface in a manner to make disassembly very difficult. This may be desirable in some installations but in others it may be a hindrance if disassembly is attempted. In FIG. 13, the modified sleeve 220 has spaced annular surface ridges 222 preferably raised about 0.002" above the cylindrical surface and, as an example, spaced axially about ⅛" apart. This configuration will be sufficient to prevent "suck-out" (pulling out) of the cable sheath but permit disassembly if desired.

A further embodiment which cannot be readily illustrated is a sleeve similar to sleeve 220 with a surface which has a roughness about comparable to a 200 to 350 microfinish where 2000 is extremely rough, such as results from said casting, and 1 to 0.5 is in the range of superfinish obtained by polishing and lapping. This range of roughness, i.e., 200 to 350 would have a height rating of about 6.3 micrometers or a little above. Clamping the contracting collet onto the sheath over a surface with this roughness will provide a good holding force against "suck-out".

In FIG. 14, a junction housing 240 is shown of the general type utilized with the connector illustrated in FIGS. 1 and 10.

What we claim is:

1. In a mechanical and electrical connector for a coaxial cable in which an outer cylindrical conductor is insulated from an inner core conductor which has a first gripping means for the outer conductor including a split sleeve to be cammed radially inward against the outer conductor by spaced camming rings on each end of said split sleeve, the improvement comprising an end housing receiving said rings and sleeve within an annular axially extending inner recess, a shoulder formed on said recess at one end to abut one of said camming rings, and inturned means at the other end of said recess to confine said rings in said recess as an assembly, and an inner anvil member having a cylindrical support section dimensioned to be received within said rings and sleeve and to be received within the inner surface of an outer conductor without deforming said conductor, and a radial flange on one end of said anvil member to contact the other of said camming rings when said end housing is assembled and threaded into a second housing.

2. A connector as defined in claim 1 which includes a second housing to receive said end housing at one end in a threaded relationship, said second housing having means to receive and clamp an inner core conductor in the inner end of a projecting conductor shaft, that improvement which comprises an outlet passage for said conductor shaft at the end of said second housing opposite to that which receives the end housing and a dielectric cylindrical insulation block in said passage having an inner and outer end and confining said conductor shaft centrally of said passage at the outer end and having an internal recess at its inner end with walls spaced from said conductor shaft.

3. A connector as defined in claim 2 in which said dielectric insulation block comprises a cup-shaped piece having a hole in the bottom and outer end to confine the conductor shaft centrally of the outlet passage.

4. A connector as defined in claim 1 in which said dielectric insulation block comprises a cylindrical piece of dielectric material having a hole at the outer end for passage of said conductor shaft, the inner walls of said block tapering outwardly from said hole toward the inner end to provide a cone-shaped recess to surround said inner conductor.

5. A connector as defined in claim 1 in which said split sleeve on its inner surface and said inner anvil member on its outer surface are formed with axially spaced annular ridges about 0.002" above the surface.

* * * * *